United States Patent [19]
Shamine et al.

[11] Patent Number: 5,622,544
[45] Date of Patent: Apr. 22, 1997

[54] AIR DRYER CARTRIDGE WITH FILTER RETAINER

[75] Inventors: Dennis R. Shamine, Lorain; Larry E. Dienes, North Ridgeville, both of Ohio

[73] Assignee: AlliedSignal Truck Brake Systems Company, Elyria, Ohio

[21] Appl. No.: 498,175

[22] Filed: Jul. 5, 1995

[51] Int. Cl.$^6$ .................................................. B01D 53/00
[52] U.S. Cl. .................... 96/134; 55/318; 55/DIG. 17; 96/136; 96/137; 96/138
[58] Field of Search .............................. 55/DIG. 17, 318, 55/385.3; 95/117, 122; 96/134, 136, 137, 138, 141, 147, 149, 151

[56] References Cited

U.S. PATENT DOCUMENTS

| | | |
|---|---|---|
| 1,930,357 | 10/1933 | Heather . |
| 2,317,816 | 4/1943 | Scott . |
| 2,505,581 | 4/1950 | Unger . |
| 2,698,061 | 12/1954 | Jaubert ............................ 55/DIG. 17 |
| 3,347,387 | 10/1967 | Balogh .................................... 96/137 |
| 3,475,885 | 11/1969 | Kline . |
| 3,655,906 | 4/1972 | De Palma . |
| 3,796,025 | 3/1974 | Kasten . |
| 4,015,959 | 4/1977 | Grote ................................ 55/DIG. 17 |
| 4,227,901 | 10/1980 | Lange ...................................... 96/136 |
| 4,385,913 | 5/1983 | Lane . |
| 4,505,727 | 3/1985 | Cullen et al. . |
| 4,713,094 | 12/1987 | Yanagawa et al. . |
| 4,816,047 | 3/1989 | Neal ........................................ 96/137 |
| 4,908,132 | 3/1990 | Koval et al. ............................ 96/137 |
| 4,946,485 | 8/1990 | Larsson .................................. 96/136 |

FOREIGN PATENT DOCUMENTS

| | | | |
|---|---|---|---|
| 2560063 | 8/1985 | France .............................. 55/DIG. 17 |
| 3523406 | 1/1987 | Germany ................................ 96/138 |
| 2126124 | 3/1984 | United Kingdom ..................... 96/138 |

OTHER PUBLICATIONS

Service Data—AD–9 Air Dryer, Nov. 1992—Bendix.

*Primary Examiner*—C. Scott Bushey
*Attorney, Agent, or Firm*—Howard G. Massung

[57] ABSTRACT

A desiccant cartridge for an air dryer of the type used for compressed air supply systems. The desiccant cartridge incorporates an internally disposed particulate filter element which functions to provide particulate filtration for air coming into the desiccant cartridge. The filter element further acts to apply a compressive loading against internal components within the desiccant cartridge insuring that these parts are firmly coupled and providing sealing engagement between components despite manufacturing tolerance variations in the component parts.

7 Claims, 4 Drawing Sheets

5,622,544

AIR DRYER CARTRIDGE WITH FILTER RETAINER

BACKGROUND OF THE INVENTION

This invention relates to a component for a motor vehicle air brake system, and particularly, to an air dryer desiccant cartridge.

Many motor vehicles, and in particular, heavy duty trucks incorporate air brake systems which use air pressure to control application of the vehicle service brakes. These systems have an air compressor driven by the vehicle engine which charges a brake system reservoir with high pressure air. The air compressor is controlled to supply air intermittently as needed to replenish the reservoir and maintain reservoir pressure within a predetermined range.

The process of compression of air results in the precipitation of water. Water and particulates in the air brake system can lead to component deterioration and interfere with optimal operation of the brake system. Accordingly, there are various devices used for removing water from the compressed air in air brake systems, known as air dryers. The function of an air dryer is to collect and remove air system contaminants in solid, liquid and vapor form before they enter the brake system. The air dryer provides clean, dry air for the components of the brake system which increases the life of the system and reduces maintenance costs. One type of air dryer incorporates a desiccant material which eliminates daily manual draining of water collection reservoirs as is required in other types of air dryers.

Desiccant type air dryers employ a volume of desiccant material which is hydrophilic and thus absorbs water which passes through an air line from the air compressor. High pressure air enters the desiccant air dryer and the water is stripped by the desiccant material. The air dryer also includes a particulate filter for trapping particulates and oil. Eventually, the desiccant material absorbs water to its maximum capacity. As a means of expelling this trapped water, modern desiccant type air dryers incorporate a backflow or purge air flow as a means of stripping the desiccant of absorbed water. A reservoir referred to as a purge volume is provided with is charged with the high pressure air supplied by the compressor. When the compressor cycles from a loaded mode producing compressed air to the unloaded mode, the purge volume air is allowed to leak to atmosphere through the desiccant bed in a reverse flow direction, stripping it of moisture and expelling it into the air. External purge volume air dryer types use a purge volume reservoir separate from the air dryer and connected to it by an air line. Another type is a so-called integral purge volume type in which the housing which contains a desiccant material also defines the purge volume. These types are in widespread use today and provide excellent performance.

In modern desiccant type air dryers some means of removing the desiccant material is provided since it requires rejuvenation after a service life period. In use, the desiccant material absorbs contaminants such as oil which ultimately reduces its water retention characteristics. Since other components of air dryers have a longer service life, a convenient system for removing the desiccant material is desired. In one type of air dryer, spin-on type desiccant cartridges are used. The desiccant cartridge resembles a conventional motor vehicle spin-on oil filter in a form of a canister with a load plate having a centrally threaded bore such that the entire unit is threaded onto an upstanding boss on a mounting surface. Another type of desiccant cartridge attachment system is being introduced by the assignee of the present application. In this type, a desiccant cartridge is held in place on an air dryer body assembly through threading of a through bolt which passes through a bore in the body assembly and engages threads on the load plate of the desiccant cartridge.

Air dryer desiccant cartridges are typically formed from a number of cup shaped formed sheet metal components which are assembled together and affixed to a load plate which mounts to the air dryer body assembly. A number of distinct chambers are formed in the air dryer assembly which are separated from one another. In the desiccant cartridge, a number of gaskets and elastomeric seals are provided to create the sealed areas. Designers of such articles continually strive for reduced cost and improved quality. Since the desiccant cartridge components are formed sheet metal parts, dimensional variability is also a concern. When the various components forming the desiccant cartridge are assembled, it is important that they generate the appropriate sealing engagement. Since these devices operate in an environment of intense vibration, it is further desired to avoid rattling of parts or relative movement between them. These objectives pose challenges in the design of air dryer desiccant cartridges.

In view of the foregoing, there is a continuing need to develop air dryer desiccant cartridges having improvements in manufacturability, cost and reliability and it is an object of this invention to provide such a device.

SUMMARY OF THE INVENTION

In accordance with this invention an air dryer desiccant cartridge is provided which incorporates a particulate filter which serves a two-fold function. The filter performs the function of ordinary air dryer particulate filters; namely, the absorption of oil and particulates entrained in the air flow stream entering the air dryer. However, in accordance with the present invention, the filter further serves the function of acting as a compressible spacer which fills the end clearance space between the cartridge outer shell and inner sleeve. Compression of the filter can occur to a varying degree, thereby taking up manufacturing variations in the parts of the cartridge. In this manner, the parts are held in a position of sealing and are also prevented from moving relative from one another, avoiding rattling or loosing of parts in use. The filter is designed to have specific compression zone areas enabling the filter to be compressed to a considerable degree in those areas. Since compression of the filter material to a great extent could impair its filtration capabilities, other areas of the filter are designed to not undergo substantial compression during the assembly process, and therefore are available to provide the filtration function.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
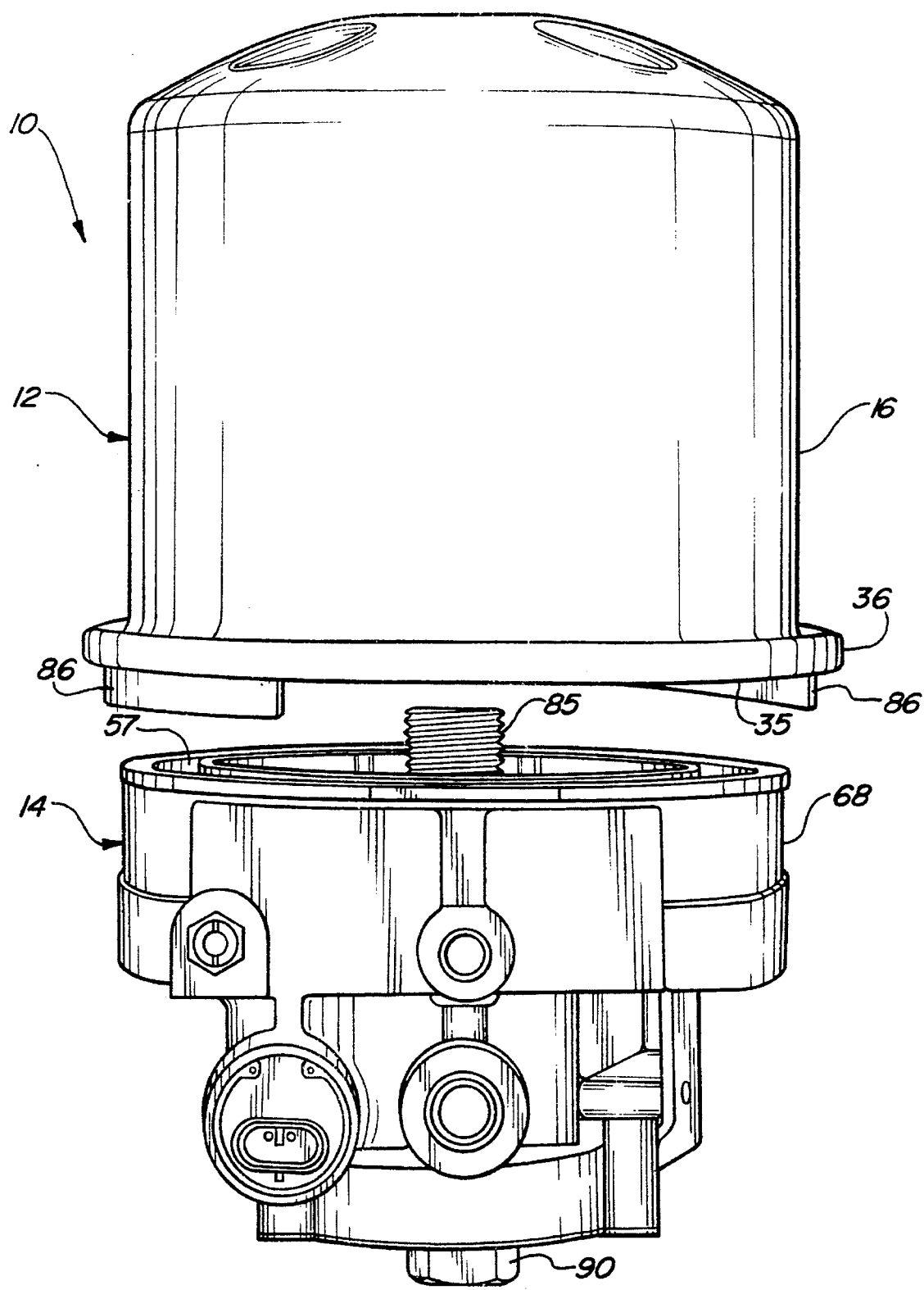
FIG. 1 is an exploded elevational view of an air dryer in accordance with the present invention.
Figure 2:
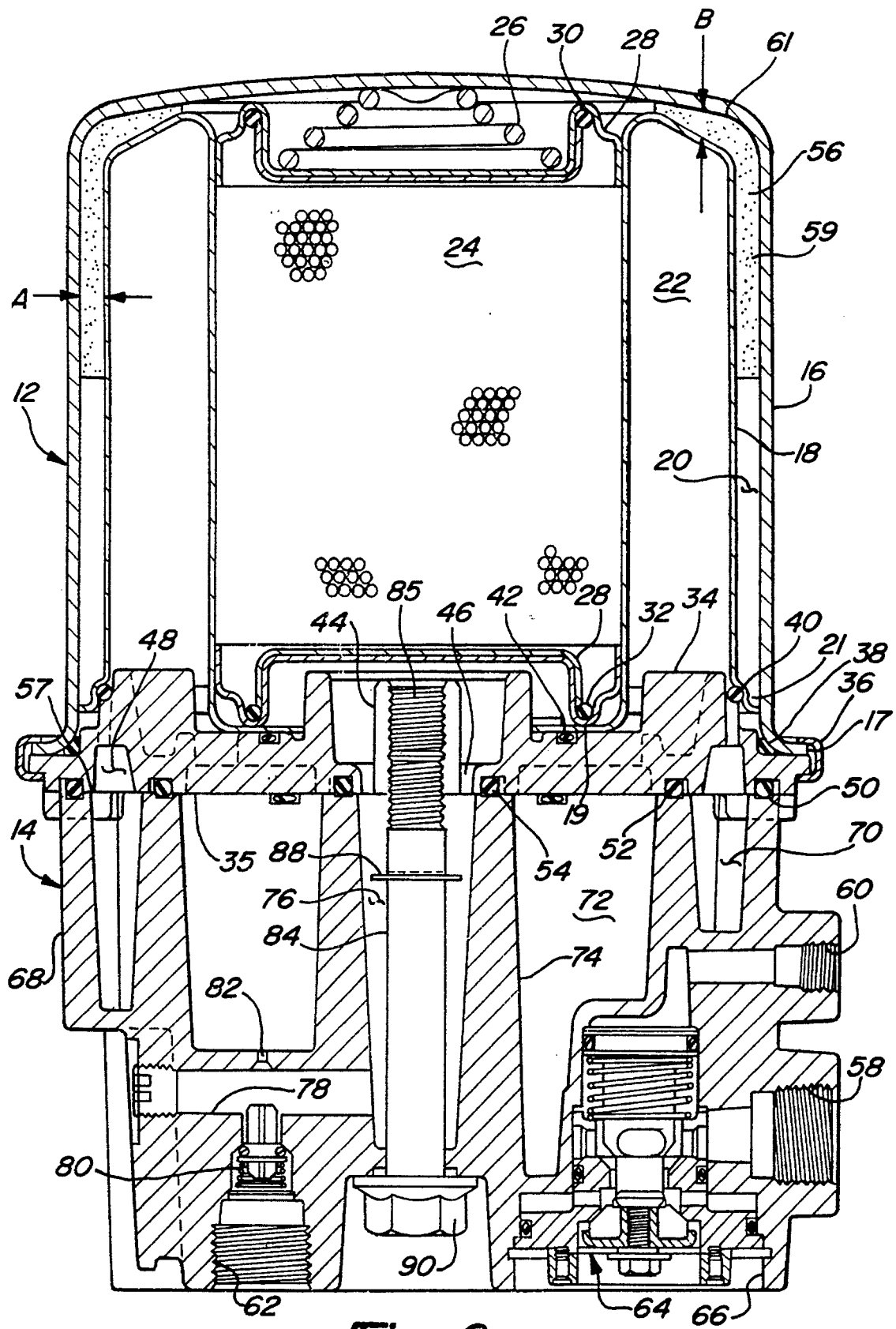
FIG. 2 is a cross-sectional view through the air dryer of FIG. 1 showing the air dryer assembled and internal components of the device.

An air dryer in accordance with the present invention is shown in FIGS. 1 and 2 and is generally designated by reference number 10. Air dryer 10 is particularly suited for use in an air supply system for motor vehicle air brakes, such as found in heavy duty trucks. Air dryer 10 principally comprises two detachable components; namely, desiccant cartridge 12 and body assembly 14.

Details of the construction of desiccant cartridge 12 are best described with reference to FIGS. 2 through 5. Cartridge 12 has a drawn sheet metal cup-shaped outer shell 16 with an open end with a perimeter edge forming bottom flange 17. Double-wall inner sleeve 18 is disposed within outer shell 16 and defines a radial clearance passageway 20 around its outer perimeter, and further defines an annular interior cavity 22. Inner sleeve 18 further has an inward turned bottom end flange 19 and outward turned end flange 21. Disposed within the inside cylindrical surface of inner sleeve 18 is desiccant bed 24. Desiccant bed 24 is comprised of a bead like granular material which has hydrophilic properties. The material comprising desiccant bed 24 is compressed by spring 26 and is retained by cloth sack 28 covering the upper and lower ends of the desiccant bed. Cloth sack 28 is maintained in position by O-rings 30 and 32. Spring 26 maintains desiccant bed 24 in a densely packed condition for optimal performance.

Air dryer cartridge outer shell 16 and inner sleeve 18 are affixed to load plate 34. As shown, outer shell 16 is affixed to load plate 34 by a rolled perimeter band 36 which pinches outer shell bottom flange 17 against the load plate. Load plate 34 has a bottom mounting surface 35 for mating with body assembly 14 and a top seal surface. O-rings 38, 40 and 42 are used to provide isolated volumes within cartridge 12, as will be described in greater detail below. At the center of load plate 34 is internally threaded boss 44. Apertures around boss 44 create flow passageway 46. An outer groove 48 in the bottom surface of load plate 34 communicates with cartridge outer passageway 20 through internal passagways (not shown). O-rings 50, 52 and 54 are positioned within concentric grooves on the bottom mounting surface of load plate 34 for sealing engagement with features of body assembly 14, as will be described in greater detail as follows. Porous filter 56 is positioned in the upper portion of cartridge outer passageway 20 and performs a filtration function, collecting particulates and oil. When cartridge 12 is assembled, outer shell 16 and inner sleeve 18 define a radial clearance space measured along line A, and an end clearance space measured along line B, both shown in FIG. 2.

A specific feature of the present invention is the design of filter 56 and its manner of incorporation into desiccant cartridge 12. In order to provide the separated volumes within desiccant cartridge 12, the integrity of the seals provided by O-rings 38, 40 and 42 is important. In the event that inner sleeve 18 were to move upwardly from its position shown in FIG. 2, leakage past the O-rings could occur. In accordance with the present invention, filter 56 insures that such sealing engagement occurs in a manner which takes up dimensional variations in outer shell 16, inner sleeve 18 and load plate 34.

Figure 3:
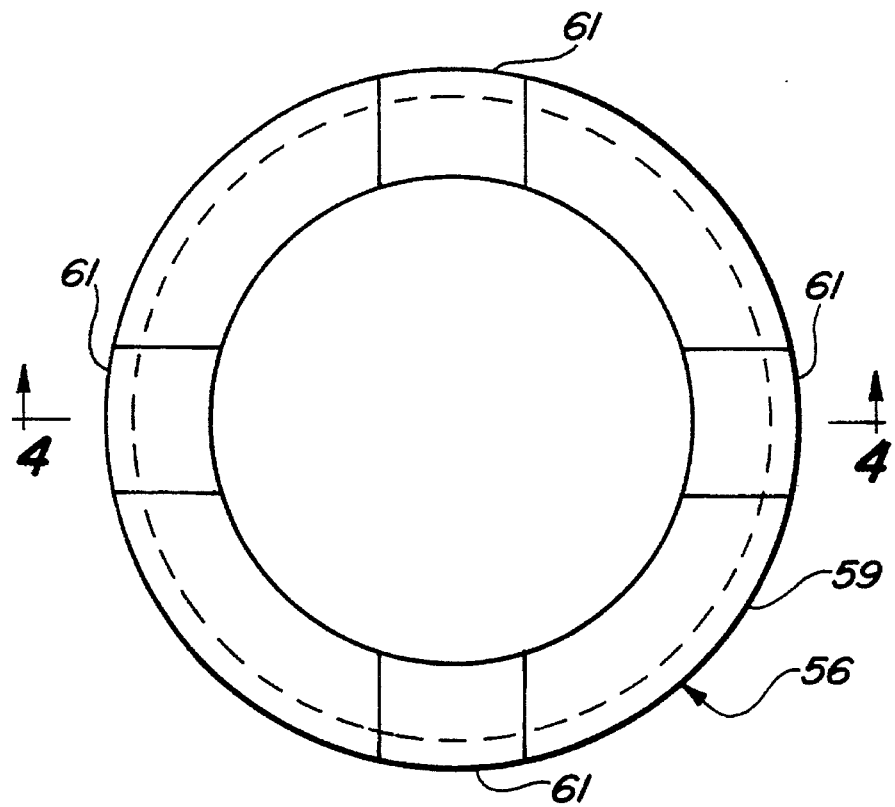
FIG. 3 is a top view of a particulate filter in accordance with the present invention.
Figure 4:
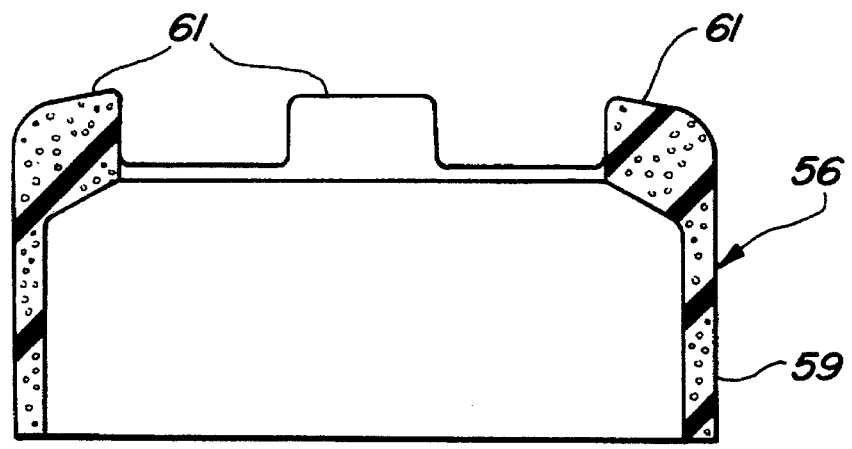
FIG. 4 is a cross-sectional view through the particulate filter shown in FIG. 3 taken along line 4—4.

With reference to FIGS. 3 and 4, filter element 56 is shown as a generally cylindrical component forming sidewall 59 and end blocks 61. As shown, end blocks 61 are locally formed axial projections at four positions about filter 56 and are evenly distributed about the upper perimeter of the filter. Filter element 56 is made of a material of the type commonly used for forming desiccant air dryer filters. For example, expanded aluminum foil mesh can be used. In one example of such material, aluminum foil of 0.003 inch thickness is expanded to define 0.050 inch wide strands and expanded to form diamond shaped open patterns of a dimension of 0.1875 inch by 0.600 inch. The material is layered and compressed slightly to a density of, for example, 0.35 to 0.43 grams per cubic centimeter. Other materials could be used in accordance with this invention. However, as will be explained later in this specification, it is important that the material making up filter element 56 be compressible or crushable.

Figure 5:
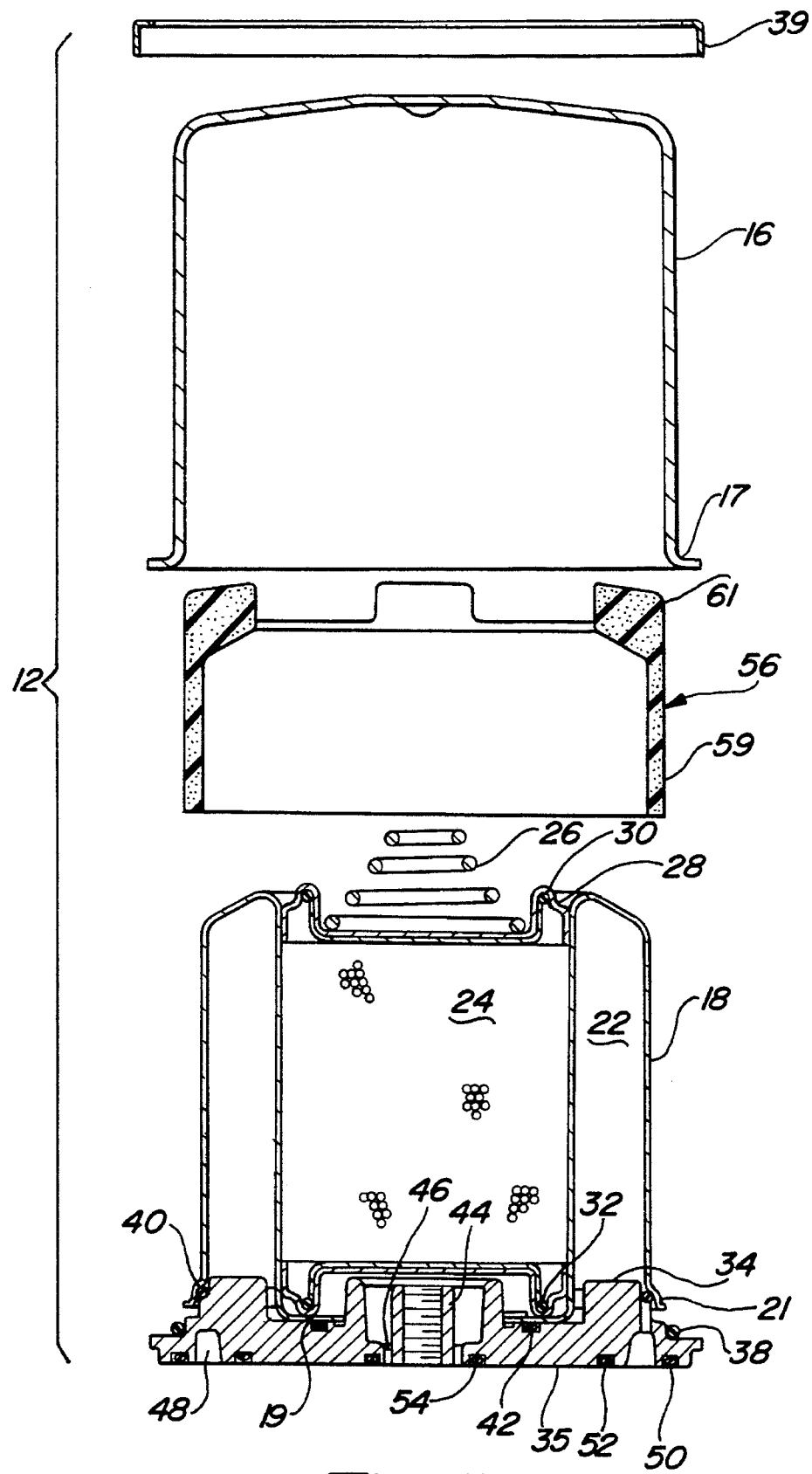
FIG. 5 is an exploded cross-sectional view of the desiccant cartridge in accordance with this invention.

FIG. 5 illustrates the components comprising desiccant cartridge 12 and shows them in an exploded position. In FIG. 5 inner sleeve 18 is shown set in position onto load plate 34. There is some retention provided by these parts due to the interaction between inner sleeve flange 21 and load plate 34 at O-ring 40. However, these parts are not firmly attached at this point. Next, filter element 56 is loaded over the top of inner sleeve 18, and outer shell 16 is then placed in position. The height of end blocks 61 is greater than the axial end clearance space between inner sleeve 18 and outer shell 16 (dimension B) when the cartridge is finally assembled. In a manufacturing operation, once these parts are assembled, a clamping force would be applied urging outer shell 16 against load plate 34 until outer shell bottom flange 17 engages the load plate perimeter surface, allowing perimeter band 34 to be installed and deformed. When this position is reached, filter end blocks 61 are at least slightly compressed. This compression exerts an axial force urging inner sleeve 18 into tight sealing engagement with load plate 34. Accordingly, inner sleeve, inner flange 19 and outer flange 21 are maintained in tight engagement with corresponding surfaces of the load plate, allowing O-rings 40 and 42 to provide their intended sealing function. Due to the conical configuration of the upper surface of inner sleeve 18, axial compression of end blocks 61 also results in a radial centering force. Compression of end blocks 61 can limit the flow of area for filtration. In view of this, end blocks 61 are intentionally provided at localized areas. In the event that a high degree of compression of end blocks 61 occurs during the manufacturing process, there remains areas in sidewall 59 of the filter element which do not experience significant compression and accordingly remain effective as filtration areas. Thus, a zone of uncompressed or lightly compressed filter material is available for air to pass through the filter and exit between end blocks 61.

Body assembly 14 forms a top mounting surface 57 for mating with load plate surface 35. Body assembly 14 further defines supply port 58 which receives compressed air from the system air compressor (not shown). Control port 60 receives a compressor control air signal which actuates the system compressor to cycle between a loaded mode producing compressed air and an unloaded mode. Delivery port 62 discharges de-watered compressed air. Purge valve assembly 64 is positioned within purge port 66 in the bottom surface of body casting 68 and communicates with supply port 58 and control port 60.

Body casting 68 defines three separate concentric internal cavities. Outer cavity 70 in the form of a perimeter groove is positioned between O-rings 50 and 52, and opens between the O-rings. Intermediate cavity 72 surrounds up-standing central boss 74 which is hollow, defining central passage 76. A radially drilled bore 78 communicates central passage 76 with delivery port 62, having check valve 80 installed therein. A small orifice 82 communicates intermediate cavity 72 with bore 78.

Cartridge 12 and body assembly 14 are fastened together by tightening bolt 84 having threaded end 85. The action of torquing bolt 84 pulls cartridge 12 and body assembly 14 tightly together with their mating surfaces 35 and 57 in sealing engagement. Cartridge 12 is prevented from rotating by interlocking between tabs 86 and features on body casting 68. Snap ring 88 installed on bolt 84 serves a retention function which will be explained later. Bolt 84 further features driving head 90 which can be engaged by a wrench or socket. When cartridge 12 is mounted, compression of O-rings 50, 52 and 54 creates distinct chambers, each partly comprised by cartridge 12 and body assembly 14. Specifically, body outer cavity 70 communicates with cartridge outer passageway 20, lower body intermediate cavity 72 communicates with cartridge annular interior cavity 22, and desiccant bed 24 communicates with central passage 76.

Operation of air dryer 10 will now be described. In the loaded mode, the system compressor supplies high pressure air to supply port 58. This air passes through purge valve assembly 64 and into body outer cavity 70 and into cartridge outer passageway 20. Air thus flows upwardly through filter 56 where particulate contaminants and oil are stripped from the air flow. Air then passes to the top of outer shell 16 and downwardly through desiccant bed 24 which strips water from the compressed air. The dry air then passes around threaded boss 44, through apertures 46 and into body central passage 76. The clean dry air then exits through check valve 80 and delivery port 62. During the compressor loaded mode, this high pressure air is allowed to flow through orifice 82 into an integral purge volume defined by body intermediate cavity 72 and cartridge inner sleeve annular interior cavity 22. Thus, this purge volume reaches the pressure of air flowing from delivery port 62.

In operation of air dryer 10 in a vehicle air supply system, once the pressure in the system's reservoir (not shown) has reached a set point, a high pressure air signal is sent to a compressor control port causing it to cycle to the unloaded mode and to air dryer control port 60. An internal diaphragm within purge valve assembly 64 closes supply port 58 and opens body outer chamber 70 to atmosphere through purge port 66. Air cannot escape the unit through delivery port 62 due to the action of check valve 80. When this occurs, the compressed air stored within the purge volume slowly leaks from orifice 82 toward purge valve assembly 64, generating a reverse air flow upwardly through body central passage 76 and desiccant bed 24. This reverse purging air flow causes water to be stripped from the desiccant bed as well as some oil and solid contaminants from filter 56 which are expelled through purge valve assembly 64.

FIG. 2 illustrates the fully assembled configuration of air dryer 10. When it is desired to remove desiccant cartridge 12, retention bolt driving head 90 is accessed using a conventional hex socket. Driving head 90 is externally accessible at the exposed bottom surface of body assembly 14. Unthreading of bolt 84 occurs while interlocking between tabs 86 and body casting 68 prevent relative rotation between the cartridge and body assembly. Once bolt 84 is entirely unthreaded from boss 44, the bolt drops down with snap ring 88 preventing the bolt from falling completely out of the body assembly, keeping it from becoming lost if it were allowed to fall out. Desiccant cartridge 12 is then simply lifted off the mounting surface 57 of body assembly 14 and replaced with a new or refurbished cartridge. The new cartridge is indexed to interlock tabs 86 with body casting 68. Thereafter, bolt 84 is meshed with threaded boss 44 and the bolt is tightened.

It is to be understood that the invention is not limited to the exact construction illustrated and described above, but that various changes and modifications may be made without departing from the spirit and scope of the invention as defined in the following claims.

We claim:

1. A desiccant cartridge for an air dryer for removing water from air flowing in a compressed air supply system and adapted to be mounted to a mounting surface of an air dryer body assembly, comprising:

a load plate forming a mounting surface adapted to mate with said body assembly mounting surface, said load plate forming passageways communicating with said body assembly, a cup-shaped outer shell having an open end defining a perimeter edge engaging said load plate, an inner sleeve disposed within said outer shell having at least one end flange engaging said load plate, said outer shell and said inner sleeve defining a radial clearance space and an end clearance space for air flow through said cartridge, a desiccant material disposed in said inner sleeve, and a filter element disposed between said outer shell and said inner sleeve in at least a portion of said end clearance space wherein said filter element, said outer shell and said inner sleeve cooperate to form a compression zone and a non-compression zone, said filter element being at least partially compressed in said compression zone between said outer shell and said inner sleeve thereby exerting a force urging said inner sleeve into engagement with said load plate and said filter being substantially uncompressed in said non-compression zone.

2. A desiccant cartridge according to claim 1 wherein said filter element further being disposed in said radial clearance space.

3. A desiccant cartridge according to claim 1 wherein said filter element is formed of layers of expanded metal mesh.

4. A desiccant cartridge according to claim 1 wherein said filter element is in the form of a cylinder having a sidewall with a plurality of local axial projections, said axial projections being compressed in said end clearance space compression zone and said sidewall being disposed in said radial clearance space.

5. A desiccant cartridge according to claim 4 wherein compression of said filter element is substantially limited to said filter element axial projections.

6. A desiccant cartridge for an air dryer for removing water from air flowing in a compressed air supply system and adapted to be mounted to a mounting surface of an air dryer body assembly, comprising:

a load plate forming a mounting surface adapted to mate with said body assembly mounting surface, said load plate further having a seal surface opposite said mounting surface, said load plate forming passageways communicating with said body assembly, a cup-shaped outer shell having an open end defining a perimeter edge engaging said load plate, an inner sleeve disposed within said outer shell having at least one end flange engaging said load plate seal surface, said outer shell and said inner sleeve defining a radial clearance space and an end clearance space for air flow through said cartridge, a desiccant material disposed in said inner sleeve, and a filter element disposed between said outer shell and said inner sleeve in the form of a cylinder having a sidewall with a plurality of local axial projections, said axial projections being compressed in said end clearance space and said sidewall being disposed in said radial clearance space, wherein compression of said axial projections exerts a force urging said inner sleeve into engagement with said load plate and radially restrains said inner sleeve relative to said outer shell, and wherein air flowing into said radial clearance space passes through said filter sidewall and exits said filter between said axial projections.

7. A desiccant cartridge according to claim 6 wherein said filter is formed of layers of expanded metal mesh.

* * * * *